2,985,689
ACETYLENIC HYDROXY COMPOUND

Morton W. Leeds, Union, N.J., assignor to Air Reduction Company, Incorporated, New York, N.Y., a corporation of New York No Drawing. Filed May 28, 1958, Ser. No. 738,290

1 Claim. (Cl. 260—635)

This invention relates to a novel chemical compound and to a process for making the same and the invention is more particularly concerned with 8,11-dimethyl-9-octadecyne-8,11-diol, which may suitably be represented by the following structural formula:

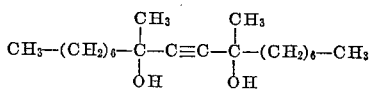

While various acetylenic diols have been heretofore proposed, it has been found that 8,11-dimethyl-9-octadecyne-8,11-diol has excellent fungicidal activity, particularly against *Stemphylium sarcinaeforme* and *Sclerotinia fructicola*, even when employed in very small concentrations. Thus, 8-11-dimethyl-9-octadecyne-8,11-diol is highly useful as the active fungicidal agent of a fungicidal composition comprising a minor proportion of this active compound in a major proportion of a suitable inert carrier or diluent therefor.

The 8,11-dimethyl-9-octadecyne-8,11-diol of this invention is suitably prepared by reacting acetylene with methyl heptyl ketone (2-nonanone) in the presence of solid KOH, preferably in powdered form, and in the presence of a polar organic solvent or diluent for the reactants such as a lower alkyl ether, e.g. diisopropyl ether. The reaction is suitably carried out at a temperature above 0° C., e.g. 30° to 50° C. although higher temperatures e.g. temperatures up to 60° C. may be employed. The ketone, the solid KOH and the diluent are added to any convenient reaction vessel, such as a four-necked flask provided with a stirrer, a reflux condenser, a ketone inlet, a gas inlet, and a thermometer. The reaction is carried out by continuously introducing acetylene and the ketone into the reaction mass with addition of acetylene being continued after the addition of the ketone has been completed until at least the required molar quantity has been introduced. Generally speaking, an excess of about 5% over the theoretically equivalent quantity is desirable. The quantity of the solid potassium hydroxide employed is suitably about 1.5 mols to 1.9 mols per mol of ketone. After the reaction is complete e.g. after about 6 hours, the reaction mixture is hydrolyzed with water and the resulting two layers are separated, the organic layer filtered, and the isopropyl ether removed from it by simple distillation. The remainder of the organic layer is then fractionally distilled under vacuum to remove unreacted ketone and any methyl heptyl acetylene carbinol which may be formed, and to separate the 8,11-dimethyl-9-octadecyne-8,11-diol which distills above 150° C. at 4 mm. of mercury pressure and has a melting point of 87–88° C.

To prepare a fungicidal composition, the 8,11-dimethyl-9-octadecyne-8,11-diol is merely combined with a major proportion of a carrier or diluent such as kerosene, alcohol, ether, acetone, or the like. If desired, the carrier or diluent may be in solid form, such as a finely-divided clay or talc, or the like, or petrolatum. Similarly, the carrier may be water, with the 8,11-dimethyl-9-octadecyne-8,11-diol colloidally dispersed in it to form a sprayable emulsion, the emulsion suitably containing any conventional emulsifying agent used in preparing aqueous fungicidal preparations such as sodium N-methyl-N-oleoyl taurate, known commercially by the name Igepon T-77, and iso-octyl phenoxy polyoxy-ethylene ethanol, known under the trade-name Igepal CO–430. Since even very small quantities of 8,11-dimethyl-9-octadecyne-8,11-diol have high fungicidal activity, the concentration of this compound in the carrier or diluent does not need to be very great. Suitable concentrations, for example, are 0.001% to 1% by weight of the carrier or diluent, preferably 0.001% to 0.01% by weight.

A typical, easily-applied composition is readily prepared, for example, by mixing one part of 8,11-dimethyl-9-octadecyne-8,11-diol with 100,000 parts of acetone. The resulting fungicidal composition may be applied to the host in any convenient manner, e.g. by spraying with a conventional spraying device.

The following specific example further illustrates the preparation of the compound of the invention, it being understood that it is given by way of exemplification only and is not intended to be limitative. Unless otherwise indicated, all parts are by weight.

Example 1

Into a 4-necked flask provided with a stirrer, a reflux condenser, a dropping funnel, a gas inlet, and a thermometer, there were charged 100 parts of powdered potassium hydroxide and 500 parts of diisopropyl ether, and 142 parts of methyl heptyl ketone were then gradually added in the course of about two hours through the dropping funnel. At the same time a current of acetylene was introduced slowly through the gas inlet. A temperature of 30° to 35° C. was maintained and the reaction was continued for about four hours after completion of the addition of the diisopropyl ether. The reaction mixture was then hydrolyzed by adding to it 150 parts of water, and the resulting 2-phase mass was separated by decantation. The organic layer was filtered and then distilled to remove the diisopropyl ether, and the distillation residue was fractionally distilled at a pressure of 4 mm. of Hg through a 35-plate fractionating column. After separation of unreacted methyl heptyl ketone and methyl heptyl acetylene carbinol, which distilled at 80° C. at 4 mm. of Hg pressure, there was obtained the desired 8,11-dimethyl-9-octadecyne-8,11-diol. The product was crystallized from benzene and was found to have a melting point of 87–88° C.

This product has the fungicidal activity described above and a fully effective fungicidal composition is obtained by dissolving one part of the product in 100,000 parts of acetone to produce a 0.001% composition.

To demonstrate the high fungicidal activity of 8,11-dimethyl-9-octadecyne-8,11-diol, 0.2 cc. drops of the above-described 0.001% composition with acetone were allowed to evaporate in 0.4 cc. cavities in depression slides to leave a residue of 1 mcg./sq.cm. of the active agent in each cavity. The cavities in one slide were then filled with spore suspensions made from 14-day old cultures of *Stemphylium sarcinaeforme* and the cavities in a second slide were filled with spore suspensions made from 7-day old cultures of *Sclerotinia fructicola*. The slides were incubated for 17 hours and evaluation of activity was made in terms of percent inhibition of spore germination. In the case of both cultures, 100% inhibition was observed. When the same tests were repeated with increased concentrations of 8,11-dimethyl-9-octadecyne-8,11-diol to provide residues of 10 mcg./sq.- cm., 100 mcg./sq.cm., and 1000 mcg./sq.cm., 100% inhibition in both cultures was again observed.

It will be understood that various changes and modifications may be made without departing from the invention described above and defined in the claim. For example, in the preparation of 8,11-dimethyl-9-octadecyne-8,11-diol, solvents other than diisopropyl ether, such as other lower alkyl aliphatic ethers, e.g. diethyl ether or methylbutyl ether, may be employed. In a similar way, polar solvents such as dioxane, methylal, dimethyl formamide, and ethylene glycol monomethyl ether, and other liquid compounds which are inert with respect to the reactants under the reaction conditions may be employed. Similarly, the carrier or diluent for the 8,11-dimethyl-9-octadecyne-8,11-diol used to prepare a fungicidal composition with this active agent may be a material other than those specifically mentioned above and any carrier or diluent commonly employed in compounding fungicidal compositions from a normally-solid active agent may be employed. It is intended, therefore, that all matter contained in the foregoing description shall be interpreted as illustrative only and not as limitative of the invention.

I claim:

8,11-dimethyl-9-octadecyne-8,11-diol.

References Cited in the file of this patent

UNITED STATES PATENTS

| | | |
|---|---|---|
| 2,385,548 | Smith | Sept. 25, 1945 |
| 2,863,929 | Lowell | Dec. 9, 1958 |

OTHER REFERENCES

Beilstein: Vol. 1, First Suppl. (1928), page 264.

Bergmann et al.: J. Applied Chem., Vol. 3, pages 39–42 (1953).

Beilstein: Vol. 1, Second Suppl. (1944), page 574.